United States Patent Office 3,585,187
Patented June 15, 1971

3,585,187
NOVEL DERIVATIVES OF BUFADIENOLIDE-GLYCOSIDES
Joachim Heider, Warthausen-Oberhofen, Wolfgang Eberlein and Hans Machleidt, Biberach, and Franz Pattermann, Ingelheim am Rhein, Germany, assignors to Boehringer Ingelheim G.m.b.H., Ingelheim am Rhein, Germany
No Drawing. Filed Dec. 28, 1967, Ser. No. 694,083
Claims priority, application Germany, Dec. 30, 1966, T 32,902; June 13, 1967, T 34,084
Int. Cl. C07c *173/00*
U.S. Cl. 260—210.5     5 Claims

ABSTRACT OF THE DISCLOSURE

The compounds are derivatives of 3-(2',3'-O-alkylidene)-α-L-rhamnosido-14β-hydroxy - bufa - 4,20,22-trienolides, useful cardiac-active agents with a positive inotropic action upon heart auricle in warm-blooded animals.

This invention relates to novel derivatives of bufadienolideglycosides, as well as to methods of preparing these compounds.

More particularly, the present invention relates to compounds of the formula

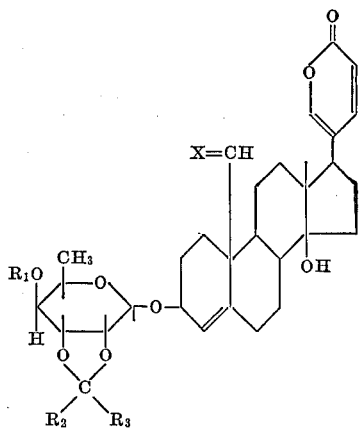

wherein:

$R_1$ is hydrogen or acetyl,
$R_2$ and $R_3$, which may be identified to or different from each other, are each hydrogen, alkyl or halo-alkyl, or, together with each other and the carbon atom to which they are attached, form an alicyclic ring of 5 to 7 carbon atoms, and
X is oxygen,

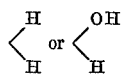

The compounds according to the present invention may be prepared by the following processes, both of which involve well known chemical principles:

METHOD A

For the preparation of a compound of the Formula I above wherein $R_1$ is hydrogen, by reacting a compound of the formula

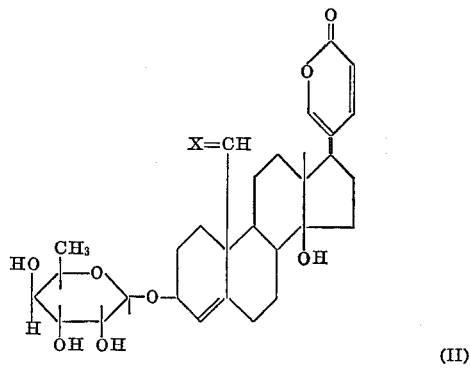

wherein X has the same meanings as in Formula I, with a compound of the formula

wherein $R_2$ and $R_3$ have the same meanings as in Formula I, whereby the two cis-hydroxyl groups of the rhamnose moiety are acetalized or ketalized.

The reaction is carried out in the presence of a dehydrating agent and advantageously at room temperature or a slightly elevated temperature, preferably between 20 and 30° C.; it may further be carried out in the presence of an inert organic solvent, such as an aromatic hydrocarbon or a chlorinated hydrocarbon, but it is preferred not to use a solvent but rather a substantial excess of compound III over and above the stoichiometric amount required for reaction with compound II.

Examples of compounds of the Formula III are aldehydes and ketones, such as propionaldehyde, chloral, acetone or cyclohexanone. The preferred dehydrating agent is anhydrous copper sulfate, but other dehydrating agents, such as hydrochloric acid or p-toluene-sulfonic acid, may also be used.

METHOD B

By reducing a compound of the formula

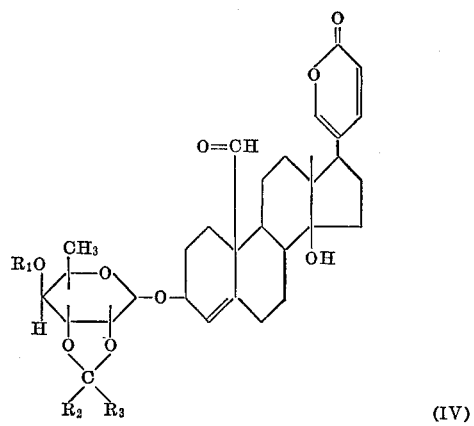

wherein $R_1$, $R_2$ and $R_3$ have the same meanings as in Formula I, with a complex metal hydride, preferably lithium tri-tert. butoxy aluminum hydride.

The reduction reaction is preferably carried out at a temperature between 0 and 25° C. and in the presence of an inert organic solvent, such as tetrahydrofuran, ether or dioxan.

The end products obtained pursuant to method A or those wherein $R_1$ is hydrogen obtained pursuant to Method B may, if desired, be subsequently acetylated according to customary methods. The acetylation may be carried out with a reactive derivative of acetic acid, such as acetyl chloride, acetic acid anhydride or a mixed anhydride of acetic acid and a carbonic acid monoester, at room temperature or moderately elevated temperatures in an inert solvent in the presence of an acid-binding agent. Suitable acid-binding agents are inorganic or tertiary organic bases; if a tertiary organic base, such as pyridine, is used as the acid-binding agent, a commensurate excess thereof may simultaneously serve as the solvent medium for the acetylation reaction.

The compound of the Formula II wherein X represents two hydrogen atoms, which is used as the starting material in Method A, is Proscillaridin A. This compound is known from the literature and may be obtained by known methods from white squill [see for example, A. Stoll and W. Kreis, Helvetica Chim. Acta 34, 1431 (1951)].

The compound of the Formula II wherein X is oxygen is scilliglaucosidin-α-L-rhamnoside, a novel compound whose isolation is described in copending application Ser. No. 670,719, filed Sept. 26, 1967. Briefly summarized, scilliglaucosidin-α-L-rhamnoside is isolated from the mother liquor obtained in the final step of the proscillaridin A recovery process starting from white squill. The mother liquor is first refluxed for 45 minutes with 1% sulfuric acid in 50% methanol, whereby the residual proscillaridin A is cleaved but not the scilliglaucosidin-α-L-rhamnoside. The latter is then separated from the aglycon of proscillaridin A by column chromatography over water-containing silica gel with the aid of a mixture of methylene chloride and methanol in a ratio of 100:5. The melting point of pure scilliglaucosidin-α-L-rhamnoside is 197–198° C. (decomposition, indistinct), and its optical rotation $[\alpha]_D^{20} = -47° \pm 2°$ (c.=1, methanol).

The compound of the Formula II wherein X is

may be obtained from scilliglaucosidin-α-L-rhamnoside by reduction with lithium tri-tert. butoxy aluminum hydride at a temperature between 0 and 25° C. in an inert solvent, such as tetrahydrofuran.

The compounds of the Formula IV used as starting materials in method B are end products of method A if X in Formula II is oxygen.

The following examples further illustrate the present invention and will enable others skilled in the art to understand it more completely. It should be understood, however, that the instant invention is not limited solely to the particular examples given below.

EXAMPLE 1

Preparation of 3β-(2′,3′-O-isopropylidene)-α-L-rhamnosido-14β-hydroxy-bufa-4,20,22-trienolide by method A 4.0 gm. of 3β-α-L-rhamnosido-14β-hydroxy-bufa-4,20,22-trienolide were admixed with 350 cc. of anhydrous acetone and 16 gm. of anhydrous copper sulfate, and the mixture was shaken for four to five hours at room temperature. The progress of the reaction was periodically checked by thin-layer chromatography. After the reaction had gone to completion, the copper sulfate was separated by vacuum filtration through a filter packed with aluminum oxide ($Al_2O_3$ according to Woelm; activity stage I). The clear filtrate was evaporated to dryness, and the residue was recrystallized from methanol. 3.4 gm. (79.0% of theory) of colorless leaflets having a melting point of 132–136° C. were obtained. The product was identified to be 3β-(2′,3′-O-isopropylidene)-α-L-rhamnosido-14β-hydroxy-bufa-4,20,22-trienolide of the formula

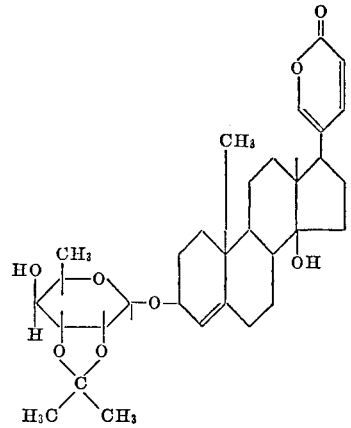

EXAMPLE 2

Preparation of 3β-(2′,3′-O-isopropylidene-4′-acetyl)-α-L-rhamnosido-14β-hydroxy-bufa-4,20,22-trienolide 3.5 gm. of 3β-(2′,3′-O-isopropylidene)-α-L-rhamnosido-14β-hydroxy-bufa-4,20,22-trienolide were dissolved in 18 cc. of pyridine, 12 cc. of acetic acid anhydride were added to the solution, and the mixture was allowed to stand for 24 hours at 20° C. The progress of the reaction was checked periodically by thin-layer chromatography. After the reaction had gone to completion, the reaction mixture was evaporated to dryness in vacuo at 50° C. The syrupy residue was dissolved in 80 cc. of chloroform, and the solution was washed first with water, then with 2 N hydrochloric acid, again with water, then with a 2 N sodium carbonate solution, and again with water. The washed solution was dried with sodium sulfate and was then evaporated to dryness in vacuo. The residue was taken up in 70 cc. of warm methanol, from which the reaction product crystallized in the form of rectangular colorless leaflets. 3.2 gm. (85.0% of theory) of 3β-(2′,3′-O-isopropylidene-4′-acetyl)-α-L - rhamnosido - 14β - hydroxy-bufa-4,20,22-trienolide, M.P. 217–220° C. (decomposition), of the formula

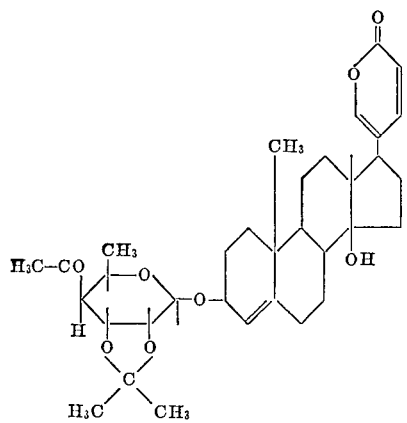

EXAMPLE 3

Preparation of 3β-(2′,3′-O-isopropylidene)-α-L-rhamnosido-14β-hydroxy-19-oxo-bufa - 4,20,22 - trienolide by method A 1.5 gm. of 3β-α-L-rhamnosido-14β-hydroxy-19-oxo-bufa-4,20,22-trienolide were admixed with 180 cc. of anhydrous acetone and 8 gm. of anhydrous copper sulfate, and the mixture was shaken for four hours at room temperature. The progress of the reaction was periodically checked by the thin-layer chromatography. After the reaction had gone to completion, the copper sulfate was separated by vacuum filtration through a filter packed with aluminum oxide (AlO₃ according to Woelm; activity stage I). The clear filtrate was evaporated to dryness, and the residue was recrystallized from 60 cc. of methanol. 1.4 gm. (87.9% of theory) of colorless rods having a melting point of 164–167° C. (decomposition) were obtained. The product was identified to be 3β-(2′,3′-O-isopropylidene)-α-L-rhamnosido-14β-hydroxy-19-oxo - bufa - 4,20, 22-trienolide of the formula

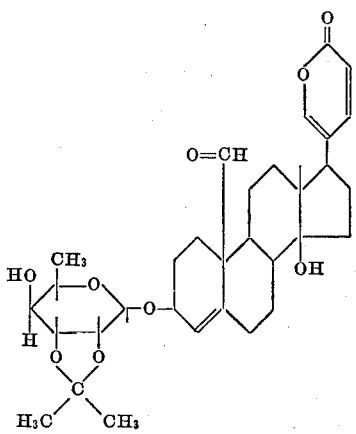

EXAMPLE 4

Preparation of 3β-(2′,3′-O-isopropylidene-4′-acetyl)-α-L-rhamnosido-14β-hydroxy-19-oxobufa-4,20,22-trienolide 1.6 gm. of 3β-(2′,3′-O-isopropylidene)-α-L-rhamnosido-14β-hydroxy-19-oxo-bufa-4,20,22-trienolide were dissolved in 12.0 cc. of pyridine, 8.0 cc. of acetic acid anhydride were added to the solution, and the mixture was allowed to stand for 24 hours at 20° C. The progress of the reaction was periodically checked by thin-layer chromatography. After the reaction had gone to completion, the reaction solution was evaporated to dryness in vacuo at 50° C. The syrupy residue was dissolved in 50 cc. of chloroform, and the solution was washed first with water, then with 2 N hydrochloric acid, again with water, then with a 2 N sodium carbonate solution, and again with water. The washed solution was dried over sodium sulfate and was evaporated to dryness in vacuo. The colorless amorphous residue was recrystallized from 40 cc. of warm methanol. 1.3 gm. (76.0% of theory) of 3β-(2′,3′-O-isopropylidone-4′-acetyl)-α-L-rhamnosido-14β-hydroxy - 19-oxo-bufa-4,20,22-trienolide, M.P. 228–231° C. (decomposition), were obtained in the form of colorless needles.

EXAMPLE 5

Preparation of 3β-(2′,3′-O-cyclohexylidene)-α-L-rhamnosido-14β-hydroxy-bufa-4,20,22-trienolide by method A Using a procedure analogous to that described in Example 1, 197 mgm. (57% of theory) of white crystalline 3β-(2′,3′-O-cyclohexylidene)-α-L-rhamnosido - 14β - hydroxy-bufa-4,20,22-trienolide, M.P. 139–141° C. (recrystallized from methylene chloride), of the formula

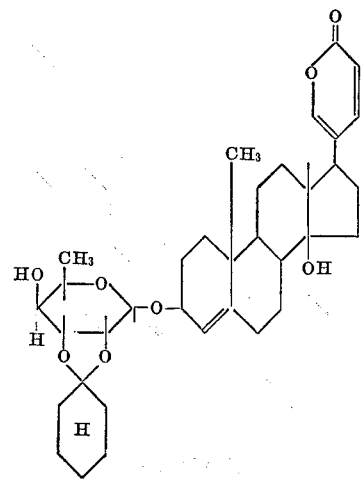

were obtained from 300 mgm. of 3β-α-L-rhamnosido-14β-hydroxy-bufa-4,20,22-trienolide, 2 gm. of copper sulfate and 80 cc. of cyclohexanone.

EXAMPLE 6

Preparation of 3β-(2′,3′-O-methylpropylidene)-α-L-rhamnosido-14β-hydroxy-19-oxo-bufa-4,20,22 - trienolide by method A Using a procedure analogous to that described in Example 3, 130 mgm. (59% of theory) of white crystalline 3β-(2′,3′-O-methylpropylidene)-α-L-rhamnosido-14β - hydroxy-19-oxo-bufa-4,20,22-trienolide, M.P. 143–146° C. (recrystallized from a 6:1 mixture of ether and n-hexane), of the formula

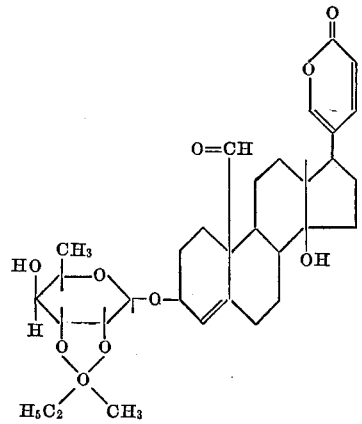

were obtained from 200 mgm. of 3β-α-L-rhamnosido-14β-hydroxy-19-oxo-bufa-4,20,22-trienolide, 1.5 gm. of copper sulfate and 80 cc. of methyl ethyl ketone.

EXAMPLE 7

Preparation of 3β-(2′,3′-O-trichloroethylidene)-α-L-rhamnosido-14β-hydroxy-19-oxo-bufa-4,20,22 - trienolide by method A A mixture of 100 mgm. of 3β-α-L-rhamnosido-14β-hydroxy-19-oxo-bufa-4,20,22-trienolide and 10 cc. of trichloroacetaldehyde was allowed to stand for 43 hours at room temperature. Thereafter, the excess unreacted chloral was distilled off in vacuo at 25° C., the residue was dissolved in chloroform, the solution was washed, and the washed solution was evaporated to dryness. The residue was recrystallized from a 5:1 mixture of ether and n-hexane, yielding 53 mgm. (43% of theory) of yellowish crystalline leaflets having a melting point of 80–86° C. The product was identified to be 3β-(2′,3′-O-trichloroethylidene)-α-L-rhamnosido-14β-hydroxy-19-oxo - bufa - 4,20, 22-trienolide of the formula

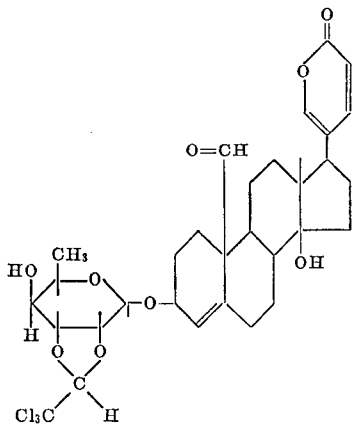

EXAMPLE 8

Preparation of 3β-(2,3'-O-propylidene)-α-L-rhamnosido-14β-hydroxy-bufa-4,20,22-trienolide by method A Using a procedure analogous to that described in Example 1, 175 mgm. (54.5% of theory) of 3β-(2',3'-O-propylidene)-α-L-rhamnosido-14β-hydroxy-bufa - 4,20,22-trienolide, M.P. 125–129° C. (recrystallized from a 1:1 mixture of ether and n-hexane), of the formula

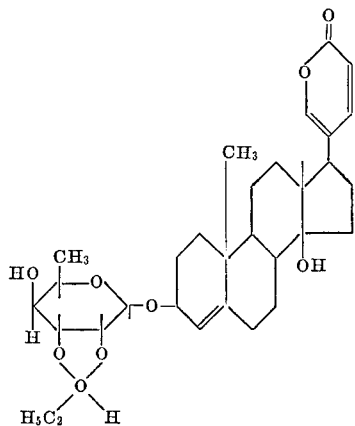

were obtained from 300 mgm. of 3β-α-L-rhamnosido-14β-hydroxy-bufa-4,20,22-trienolide, 2 gm. of copper sulfate and 60 cc. of propionaldehyde.

EXAMPLE 9

Preparation of 3β-(2',3'-O-isopropylidene-4'-acetyl)-α-L-rhamnosido - 14β,19 - dihydroxy - bufa - 4,20,22 - trienolide by method B A solution of 2 gm. of 3β-(2',3'-O-isopropylidene-4'-acetyl) - α -L - rhamnosido - 14β - hydroxy - 19 - oxo - bufa-4,20,22-trienolide in 50 cc. of dry tetrahydrofuran was combined with a solution of 4 gm. of lithium tri-tert. butoxy aluminum hydride in 50 cc. of tetrahydrofuran, and the mixture was allowed to stand for three hours at 0° C. The progress of the reaction was periodically checked by thin-layer chromatography. After the reaction had gone to completion the reaction mixture was neutralized with aqueous 5% acetic acid, the neutral solution was extracted with chloroform, the extract solution was washed with a saturated aqueous sodium bicarbonate solution and then with water, the washed solution was dried with sodium sulfate, and the dry solution was evaporated to dryness. The residue was purified by passing it through a silicagel column (0.2–0.5 mm.) with chloroform to which increasing amounts of acetone were added. 1.53 gm. (74.5% of theory) of 3β-(2',3'-O-isopropylidene-4'-acetyl) - α - L - rhamnosido - 14β,19 - dihydroxy - bufa - 4,20,22-trienolide, M.P. 140–142° C., of the formula

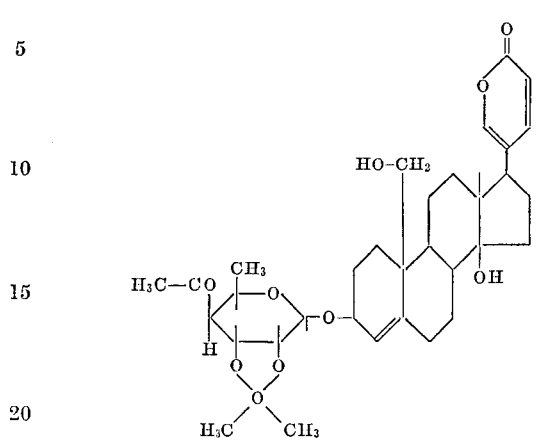

were obtained.

EXAMPLE 10

Preparation of 3β-(2',3'-O-methylpropylidene)-α-L-rhamnosido - 14β,19 - dihydroxy - bufa - 4,20,22 - trienolide by method B A solution of 80 mgm. of 3β-(2',3'-O-methylpropylidene) - α - L - rhamnosido - 14β- -hydroxy - 19 - oxo - bufa-4,20,22-trienolide in 5 cc. of tetrahydrofuran was combined with a solution of 160 mgm. of lithium tri-tert. butoxy aluminum hydride in 5 cc. of tetrahydrofuran, and the mixture was allowed to stand for 2.5 hours at 0° C. Thereafter, the reaction mixture was worked up as described in Example 9, and the reaction product was recrystallized from aqueous ethanol. 60 mgm. (74.5% of theory) of 3β-(2',3'-O-methylpropylidene)-α-L-rhamnosido - 14β,19 - dihydroxy - bufa - 4,20,22 - trienolide, M.P. 150–152° C., were obtained.

EXAMPLLE 11

Preparation of 3β-(2',3'-O-isopropylidene)-α-L-rhamnosido - 14β,19 - dihydroxy - bufa - 4,20,22 - trienolide by method B 500 mgm. of 3β-(2',3'-O-isopropylidene)-α-L-rhamnosido-14β-hydroxy-19-oxo-bufa-4,20,22-trienolide were dissolved in 25 cc. of tetrahydrofuran, the resulting solution was combined with a solution of 1 gm. of lithium tri-tert.butoxy aluminum hydride in 25 cc. of tetrahydrofuran, and the mixture was allowed to stand for 2.5 hours at 0° C. Thereafter, the reaction mixture was worked up as described in Example 9, and the product was recrystallized from a mixture of acetone and ether. 300 mgm. (60% of theory) of 3β-(2',3'-O-isopropylidene)-α-L-rhamnosido-14β,19-dihydroxy-bufa-4,20,22-trienolide, M.P. 168–171° C. (decomposition), were obtained.

EXAMPLE 12

Preparation of 3β-(2',3'-O-isopropylidene-4'-acetyl)-α-L-rhamnosido-14β,19-dihydroxy-bufa-4,20,22-trienolide 0.03 cc. of acetic acid anhydride was added to a solution of 200 mgm. of 3β-(2',3'-O-isopropylidene)-α-L-rhamnosido - 14β,19 - dihydroxy - bufa - 4,20,22 - trienolide in 0.1 cc. of pyridine, and the mixture was allowed to stand for 48 hours at 0° C. Thereafter, the reaction solution was evaporated to dryness, and the residue was taken up in chloroform. Thin-layer chromatography of the chloroform solution showed that it contained about equal amounts of reaction product and starting material. The two components were separated by passing the chloroform solution through a silicagel column (0.2–0.5 mm.) with mixtures of methylene chloride and methanol as the eluant. 65.1 mgm. (30.1% of theory) of 3β-(2',3'-O-isopropylidene - 4' - acetyl) - α - L - rhamnosido - 14β,19 - dihydroxy-bufa-4,20,22-trienolide, M.P. 140–141° C., were obtained.

The product was identical to that obtained in Example 9, as ascertained by mixed melting point and mixed thin-layer chromatogram determinations.

EXAMPLE 13

Preparation of $3\beta$-($2'$,$3'$-O-isopropylidene)-$\alpha$-L-rhamnosido - $14\beta$,19 - dihydroxy - bufa - 4,20,22 - trienolide by method A (a) $3\beta$ - $\alpha$ - L - rhamnosido - $14\beta$,19 - dihydroxy - bufa-4,20,22-trienolide.—1.63 gm. of scilliglaucosidin-$\alpha$-L-rhamnoside were dissolved in 75 cc. of absolute tetrahydrofuran, 4.4 gm. of lithium tri-tert.butoxy aluminum hydride were added to the solution, and the mixture was allowed to stand for five hours at 0° C. Thereafter, the reaction solution was worked up and the product purified as described in Example 9. 1.1 gm. (67% of theory) of $3\beta$ - $\alpha$- -L - rhamnosido - $14\beta$,19 - dihydroxy - bufa - 4,20,22-trienolide, M.P. 213–217° C., were obtained.

(b) $3\beta$ - ($2'$,$3'$ - O - isopropylidene) - $\alpha$ - L - rhamnosido - $14\beta$,19 - dihydroxy - bufa - 4,20,22 - trienolide.—A mixture of 200 mgm. of $3\beta$-$\alpha$-L-rhamnosido-$14\beta$,19-dihydroxy-bufa-4,20,22-trienolide, 50 cc. of anhydrous acetone and 3 gm. of anhydrous copper sulfate was shaken for eight hours at room temperature. Thereafter, the copper sulfate was filtered off over aluminum oxide, the filtrate was concentrated to a small volume by evaporation, and the reaction product was purified in a silicagel column (0.2–0.5 mm.) with a 3:2 mixture of chloroform and acetone. 168 gm. (78% of theory) of $3\beta$-($2'$,$3'$-O-isopropylene) - $\alpha$ - L - rhamnosido - $14\beta$,19 - dihydroxy - bufa-4,20,22-trienolide, M.P. 162–164° C. (decomposition), were obtained.

The product was identical to that obtained in Example 11, as ascertained by mixed thin-layer chromatogram determination.

The compounds according to the present invention, that is, those embraced by Formula I, have useful pharmacodynamic properties. More particularly, they produce a positive inotropic effect upon the auricular heart muscle in warm-blooded animals, such as guinea pigs and cats, coupled with low toxicity.

The above pharmacological activity was substantiated by the following tests.

The compounds tested were:

(A) $3\beta$-($2'$,$3'$ - O - isopropylidene)-$\alpha$-L-rhamnosido-$14\beta$-hydroxy - 19 - oxo-bufa-4,20,22-trienolide (Example 3), and (B) $3\beta$-($2'$,$3'$-O-isopropylidene-$4'$-acetyl)-$\alpha$-L-rhamnosido-$14\beta$,19-dihydroxy-bufa-4,20,22-trienolide (Example 12).

(1) Determination of positive inotropic activity upon isolated auricle of guinea pig heart damaged by $Ca^{++}$-withdrawal Isolated guinea pig auricles beat spontaneously until equilibration in normal Tyrode's solution at 30° C. By replacement of such a Tyrode's solution with one wherein the $Ca^{++}$-content is reduced to one-third of normal, a $Ca^{++}$-insufficiency is created, due to which the isotomically registered stroke strength regresses to about 20% of the initial value after 20 minutes. If, at this point, an effective cardiac glycoside is administered, a positive inotropic effect is observed and whose intensity is measured 30 minutes after administration of the cardiac glycoside. From a plot of the dosage-activity curve, the concentration of cardiac-glycoside is determined which produces a 100% increase in the stroke strength ($ED_{100}$).

Using the above-described method, the following results were obtained for compounds A and B according to the invention.

| Compound: | $ED_{100}$, gm./ml. |
|---|---|
| A | $2.2 \times 10^{-8}$ |
| B | $3.65 \times 10^{-8}$ |

These values show that the compounds in question are highly effective cardiac glycosides.

(2) Determination of the intravenous lethal dose in guinea pigs

Using the method of Knaffl and Lenz, Arch. exper. Path u. Pharmak. 135, 259 (1928), the intravenous lethal dose ($LD_{100}$) of compounds A and B was determined by continuous infusion in adult guinea pigs. The following results were obtained:

| | Number of animals | Duration of infusion in minutes | $LD_{100}\gamma$/kg. i.v.$\pm S_{\bar{x}}$ |
|---|---|---|---|
| Compound: | | | |
| A | 5 | 22.5 | 366.67±29.32 |
| B | 7 | 28.5 | 262.92±22.79 |

(3) Determination of intravenous lethal dose in cats

Using the method of Hatcher, the intravenous lethal dose ($LD_{100}$) of compounds A and B was determined by continuous infusion in cats. The following results were obtained:

| | Number of animals | Duration of infusion in minutes | $LD_{100}\gamma$/kg. i.v.$\pm S_{\bar{x}}$ |
|---|---|---|---|
| Compound: | | | |
| A | 10 | 96.8 | 216.8±17.4 |
| B | 6 | 61.7 | 556.4±15.4 |

(4) Estimate of enteral resorption ratio

Using the method of Hatcher, compounds A and B were continually infused intraduodenally, and their respective lethal doses ($LD_{100}$ i.d.) were determined. By comparison of the intraduodenal $LD_{100}$ with the intravenous $LD_{100}$, the resorbed amount during the period of infusion was calculated in terms of percent of the intraduodenal $LD_{100}$. The following results were obtained:

| | Number of animals | Duration of infusion in minutes | $LD_{100}\gamma$/kg. i.d. | Average resorption ratio in percent |
|---|---|---|---|---|
| Compound: | | | | |
| A | 10 | 160.2 | 578.95 | 38.9 |
| B | 5 | 142.25 | 2,416.25 | 23.25 |

These values show that the compounds of the invention have very favorable enteral and thus also peroral resorption rates, which is a great advantage in the case of cardiac glycosides.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, wafers, capsules, powders, solutions, suspensions, emulsions, syrups, suppositories or the like.

The effective dosage unit range of the compounds according to the present invention is from 0.02 to 0.34 mgm./kg. body weight.

The following examples illustrate a few dosage unit compositions comprising a compound according to the present invention as an active ingredient, and represent the best mode contemplated of putting the invention to practical use. The parts are parts by weight unless otherwise specified.

EXAMPLE 14

Tablets

The tablet composition was compounded from the following ingredients:

| | Parts |
|---|---|
| 3β - (2′,3′ - O - isopropylidene)α-L-rhamnosido-14β - hydroxy-bufa - 4,20,22 - trienolide | 0.25 |
| Lactose | 85.75 |
| Potato starch | 30.0 |
| Gelatin | 3.0 |
| Magnesium stearate | 1.0 |
| Total | 120.0 |

Compounding procedure.—The bufatrienolide glycoside was intimately admixed with about 2.5 parts of lactose, the remaining amount of lactose and the potato starch were admixed therewith, the mixture was moistened with an aqueous 10% solution of the gelatin, and the moist mass was forced through a 1.5 mm.-mesh screen. The granulate obtained thereby was passed through a 1 mm.-mesh screen, admixed with the magnesium stearate, and the mixture was pressed into 120 mgm.-tablets. One tablet contained 0.25 mgm. of the bufatrienolide glycoside and, when administered perorally to a warm-blooded animal of about 60 kg. body weight in need of such treatment, produced a very good positive inotropic effect upon the auricular heart muscle.

EXAMPLE 15

Coated pills

The pill core composition was compounded from the following ingredients:

| | Parts |
|---|---|
| 3β - (2′,3′ - O - isopropylidene)-α-L-rhamnosido-14β - hydroxy-bufa - 4,20,22 - trienolide | 0.25 |
| Lactose | 32.25 |
| Corn starch | 15.0 |
| Polyvinylpyrrolidone | 2.0 |
| Magnesium stearate | 0.5 |
| Total | 50.0 |

Compounding procedure.—The bufatrienolide glycoside was intimately admixed with about 2.5 parts of lactose, the remaining amount of lactose and the corn starch were added thereto, the mixture was moistened with an aqueous 15% solution of the polyvinylpyrrolidone, and the moist mass was forced through a 1 mm.-mesh screen. The moist granulate obtained thereby was dried at 40° C., again passed through the screen, the magnesium stearate was admixed therewith, and the mixture was pressed into 50 mgm.-pill cores, which were subsequently coated with a thin shell consisting essentially of talcum and sugar and then polished with beeswax. One coated pill contained 0.25 mgm. of the bufatrienolide glycoside and, when administered perorally to a warm-blooded animal of about 60 kg. body weight in need of such treatment, produced a very good positive inotropic effect upon the auricular heart muscle.

EXAMPLE 16

Drop solution

The solution was compounded from the following ingredients:

| | Parts |
|---|---|
| 3β - (2′,3′ - O - isopropylidene - 4′ - acetyl)α-L-rhamnosido - 14β,19 - dihydroxy-bufa - 4,20,22-trienolide | 0.0125 |
| Saccharin sodium | 0.3 |
| Sorbic acid | 0.1 |
| Ethanol | 30.0 |
| Flavoring | 1.0 |
| Distilled water q.s.ad 100.0 parts by vol. | |

Compounding procedure.—The bufatrienolide glycoside and the flavoring were dissolved in the ethanol, the resulting solution was admixed with a solution of the sorbic acid and the saccharin sodium in the distilled water and the mixed solution was filtered until free from suspended matter. 1 cc. (5 drops) of the filtrate contained 0.125 mgm. of the bufatrienolide glycoside and, when administered perorally to a warm-blooded animal of about 60 kg. body weight in need of such treatment, produced a very good inotropic effect upon the auricular heart muscle.

EXAMPLE 17

Hypodermic solution

The solution was compounded from the following ingredients:

| | Parts |
|---|---|
| 3β - (2′,3′ - O - isopropylidene)-α-L-rhamnosido-14β-hydroxy - 19 - oxo-bufa-4,20,22-trienolide | 0.25 |
| Polyethyleneglycol 600 | 150.00 |
| Tartaric acid | 5.00 |
| Distilled water q.s.ad 3000.0 parts by vol. | |

Compounding procedure.—The tartaric acid, the polyethyleneglycol and the bufatrienolide glycoside were successively dissolved in a sufficient amount of distilled water, the solution was diluted to the indicated volume with distilled water, the dilute solution was filtered until free from suspended matter, and the filtrate was filled into white 3 cc.-ampules in an atmosphere of nitrogen. The filled ampules were then sterilized for 20 minutes at 120° C. One ampule contained 0.25 mgm. of the bufatrienolide glycoside, and when the contents thereof were administered by intravenous injection to a warm-blooded animal of about 60 kg. body weight in need of such treatment, a very good positive inotropic effect upon the auricular heart muscle was produced.

EXAMPLE 18

Suppositories

The suppository composition was compounded from the following ingredients:

| | Parts |
|---|---|
| 3β - (2′,3′ - O - isopropylidene) - α-L-rhamnosido-14β - hydroxy - 19 - oxo-bufa-4,20,22-trienolide | 0.25 |
| Lactose | 4.75 |
| Cocoa butter | 1695.0 |
| Total | 1700.0 |

Compounding procedure.—The cocoa butter was melted and cooled to 40° C., an intimate mixture of the bufatrienolide glycoside and the lactose was stirred into the cocoa butter with the aid of an immersion homogenizer, and the homogeneous mixture was cooled to 37° C. and then poured into cooled suppository molds, each holding 1700 mgm. of the mixture. One suppository contained 0.25 mgm. of the bufatrienolide glycoside and, when administered by the rectal route to a warm-blooded animal of about 60 kg. body weight in need of such treatment, produced a very good positive inotropic effect upon the auricular heart muscle.

Although the above dosage unit composition examples illustrate only three specific compounds of the generic class of compounds embraced by Formula I as active ingredients, it should be understood that any of the other members of the said generic class may be substituted for the particular glycoside compounds in Examples 14 through 18, and that such compositions produce the same pharmacological effect. Moreover, the amount of active ingredient in these examples may be varied to achieve the dosage unit range set forth above, and the amounts and nature of the inert pharmaceutical carrier components may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

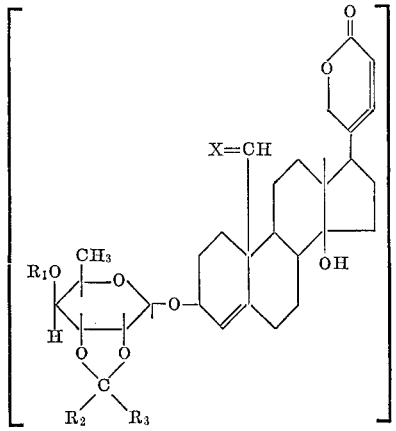

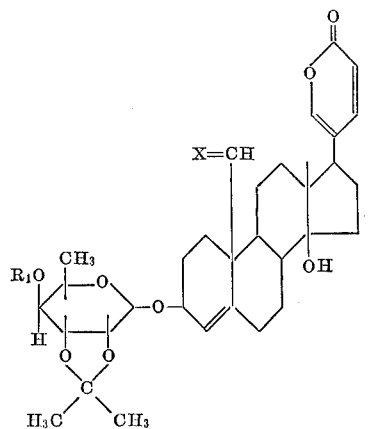

wherein
R$_1$ is hydrogen or acetyl, and
X is oxygen or

2. A compound according to claim 1, wherein R$_1$ is hydrogen, R$_2$ and R$_3$ are methyl, and X is oxygen.

3. A compound according to claim 1, wherein R$_1$ is acetyl, R$_2$ and R$_3$ are methyl, and X is oxygen.

4. A compound according to claim 1, wherein R$_1$ is acetyl, R$_2$ and R$_3$ are methyl, and X is

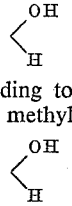

5. A compound according to claim 1, wherein R$_1$ is hydrogen, R$_2$ and R$_3$ are methyl, and X is

References Cited
UNITED STATES PATENTS

| | | | |
|---|---|---|---|
| 3,361,630 | 1/1968 | Steidle | 260—210.5 |
| 3,471,470 | 10/1969 | Heider et al. | 260—210.5 |

ELBERT L. ROBERTS, Primary Examiner
J. R. BROWN, Assistant Examiner

U.S. Cl. X.R.
424—182

PO-1050
(5/69)

UNITED STATES PATENT OFFICE
CERTIFICATE OF CORRECTION

Patent No. 3,585,187         Dated June 15, 1971

Inventor(s) JOACHIM HEIDER, WOLFGANG EBERLEIN, HANS MACHLEIDT and FRANZ PATTERMANN It is certified that error appears in the above-identified patent and that said Letters Patent are hereby corrected as shown below:

Col. 1, line 54:   "identified" should read --identical--.

Col. 5, line 10:   "87.9%" should read --87.0%--;
        line 46:   "oxobufa" should read --oxo-bufa--.

Col. 6, line 53:  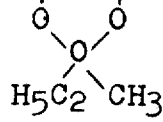  should read  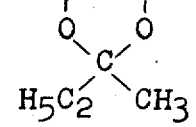

Col. 7, line 46:  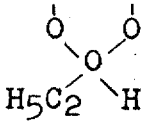  should read  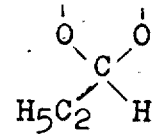

Col. 8, line 19:  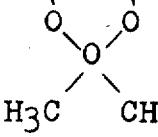  should read  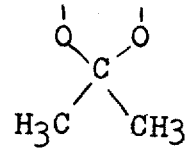

Col. 10, line 52:  "5" should read --4--.

Col. 13, line 7-25:  delete the first formula.

Column 14, lines 8, 10, 12 and 18: cancel

"$R_2$ and $R_3$ are methyl,"

Signed and sealed this 11th day of January 1972.

(SEAL)
Attest:

EDWARD M. FLETCHER, JR.          ROBERT GOTTSCHALK
Attesting Officer                Acting Commissioner of Patents